Patented Oct. 30, 1928.

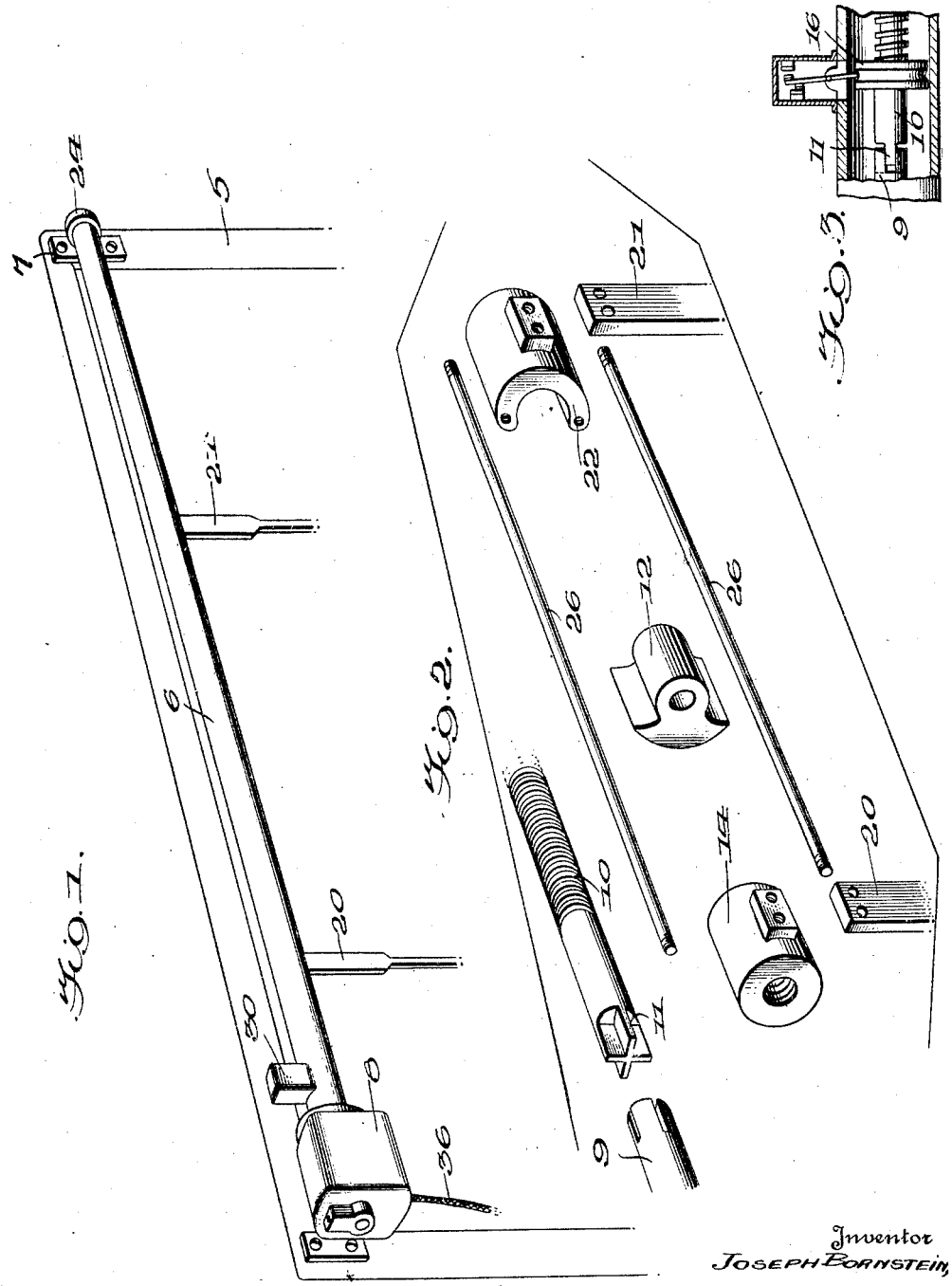

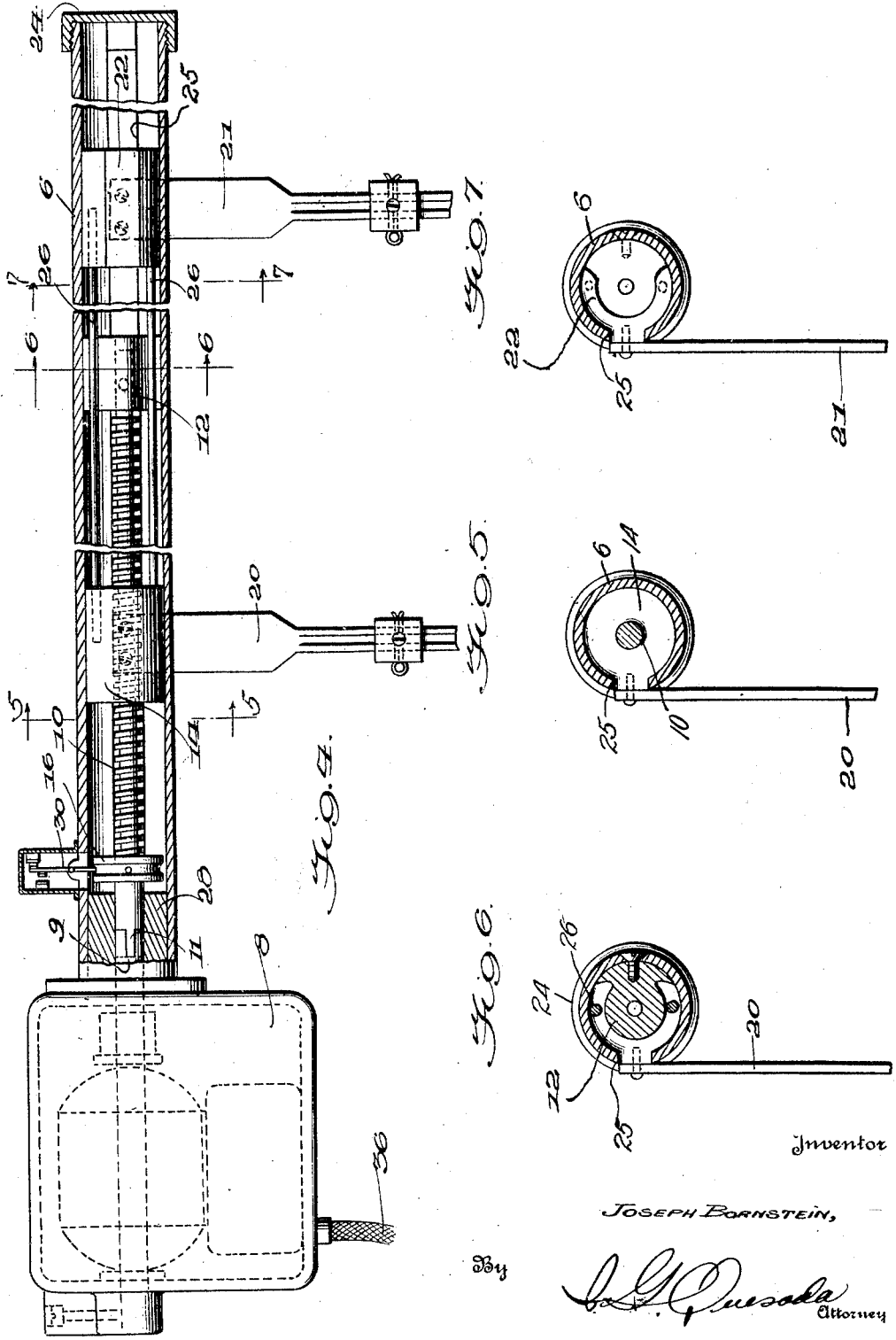

1,689,617

UNITED STATES PATENT OFFICE.

JOSEPH BORNSTEIN, OF BOSTON, MASSACHUSETTS, ASSIGNOR, BY DIRECT AND MESNE ASSIGNMENTS, TO SOMBCO, INC., OF BOSTON, MASSACHUSETTS, A CORPORATION OF MASSACHUSETTS.

WINDSHIELD WIPER.

Application filed October 17, 1927. Serial No. 226,784.

This invention relates to wind shield wipers of the motor actuated type.

Briefly stated, an important object of the invention is to provide a wind shield wiper embodying a wiper arm feed screw mounted to partake of a limited longitudinal movement under the influence of the thrust thereof when the wiper arm reaches the end of movement in one direction, the longitudinal movement of the feed screw being relied on to bring about the operation of a reversing switch by which the direction of rotation of the electric motor for the feed screw may be reversed.

A further and equally important object is to provide a wind shield wiper having simple means by which a pair of wiper units may be mounted to operate in tandem across a wind shield to assure a wide range of vision.

Another aim is to provide a motor actuated windshield wiper in which the whipping so commonly found in the feed screws of other wipers is effectively combated by employing a feed screw of a greatly reduced length and in connecting only one of a plurality of connected wipers to the feed screw and accomplishing the simultaneous travel of all the wipers through their connection with each other and the connection of one of the wipers with the feed screw.

Another and equally important object is to provide a wind shield wiper of the character specified which is of highly simplified construction, durable in use and cheap to manufacture.

Further, an aim of the invention is to provide a wind shield wiper which may be installed on a motor vehicle or the like during manufacture or at any time thereafter in a highly convenient and expeditious manner and which when applied will not mar the appearance of the vehicle.

Other objects and advantages will be apparent during the course of the following description.

In the accompanying drawings forming a part of this application and in which like numerals are employed to designate like parts throughout the same, Figure 1 is a perspective of the wiper applied, Figure 2 is a group perspective, Figure 3 is a detail view, Figure 4 is a longitudinal sectional view through the wiper, Figure 5 is a vertical transverse sectional view taken on line 5—5 of Figure 4, Figure 6 is a vertical transverse sectional view taken on line 6—6 of Figure 4, Figure 7 is a vertical transverse sectional view taken on line 7—7 of Figure 4.

In the drawings the numeral 5 designates a wind shield across the front of which a tubular support 6 is secured by brackets 7 of any preferred type. One end of the tubular support is shown to have connection with a casing 8 within which an electric motor shown in dotted lines is housed.

Figure 4 clearly illustrates that the armature shaft 9 of the motor has connection with a driving means in the nature of a feed screw 10 through a tongue in groove connection which permits of longitudinal movement of the fed screw within the limits thereof without disturbing the driving connection between the motor and the screw. More specifically, one end of the armature shaft is provided with intersecting grooves slidably receiving intersecting tongues 11 on the feed screw 10. This connection, as previously suggested, permits the feed screw to move longitudinally under the influence of the thrust thereon to bring about the operation of a reversing switch.

The end of the feed screw 10 remote from the motor is rotatably and slidably mounted within a bearing 12 secured to the intermediate portion of the tubular support 6 by screws or similar fastening devices as suggested in Figure 6. In carrying out the invention a feed nut or attaching member 14 is threaded on the feed screw 10 between the bearing 12 and a motion transmitting collar or actuating element 16 and is adapted to move longitudinally of the tubular support in response to the turning of the feed screw.

The nut 14 functions as an attaching member for a wiper 20 of conventional or other design, the wiper being rigidly secured to the nut 14 so that the squeegee thereof is caused to move in a straight path across a portion of the wind shield.

A second wiper 21 is provided with an attaching member 22 slidably mounted within the tubular member 6 between the bearing 12 and the closed end 24 of the tubular member.

One or more tie rods 26 connect the members 14 and 22 for operation in tandem. Referring now to Figure 6 it will be seen that the bearing member 12 has the upper and lower sides thereof spaced from the upper and lower sides of the tubular member 6 to permit of the free longitudinal movement of the tie rods.

Figures 5 and 7 illustrate that the rear side of the tubular support 6 is formed with a longitudinal slot 25 slidably receiving radial projections of the members 14 and 22 to hold the members 14 and 22 against turning.

It is believed to be apparent from the foregoing that the illustrated arrangement of the wiping elements 20 and 21 provides for the simultaneous operation of the wipers and a substantial reduction in the length of the feed screw so that whipping of the feed screw is avoided. However, the feed screw may be continued beyond the nut 12 with a plain or threaded portion.

Particular attention is now directed to the fact that the members 12 and 16 function as bumpers against which the feed nut 14 engages to bring about the longitudinal movement of the feed screw under the influence of the thrust thereon. In explaining this it is pointed out that when the nut 14 reaches the limit of movement in the direction of the motor the same will be engaged with the collar 16 and continued turning of the feed screw will result in the limited longitudinal movement of the same within the bearings 12 and 28 so that the operating arm 30, of a switch is moved from one extreme position to the other. Figure 4 clearly illustrates that the switch operating arm 30 is extended into a circumferential groove in the collar 16.

When the switch operating arm 30 is thus moved from one extreme position to the other the motor is reversed to change the direction of rotation of the feed screw whereupon the direction of travel of the wipers 20 and 21 is reversed. The rotation of the feed screw creates an end thrust which positively holds the collar 16 and the arm connected thereto in an extreme position until the nut 14 reaches the limit of movement in one direction.

It is here pointed out that the reversing mechanism may consist of separate longitudinally spaced contacts over which a movable contact is adapted to slide when the member 14 reaches the limit of movement in one direction. However, the reversing switch may be of any construction and may be placed either interiorly or exteriorly of the motor casing.

Of course, the electric switch is connected in the usual and well known manner with the electric motor and a suitable source of supply, such as a storage battery, may be relied on to supply current to the motor through a cable 36 and the switch.

A wind shield wiper constructed in accordance with this invention requires little machine work and consequently the cost of the same is greatly reduced as compared to other wind shield wipers in which the wiping element or elements move straight across the wind shield.

Die castings may be relied on largely in the manufacture of the wiper and the assembly of the various parts into the completed article will be found to be very much simplified.

As suggested in the objects a wind shield constructed in accordance with this invention may be installed on a motor vehicle or the like during manufacture or at any time thereafter without the exercise of unusual skill and without marring the appearance of the vehicle.

The electrical connection may be made by those of limited knowledge of electrical matters so that the wiper may be expeditiously and economically applied by the users of the same.

Having thus described the invention, what is claimed is:

1. In a structure of the character specified, the combination of a support, a motor carried by said support and having a shaft, a feed screw carried by said support and being movable endwise with respect to the motor, there being a loose driving connection between said feed screw and said shaft, a bearing enclosing the connection between said feed screw and said shaft, and a motor reversing mechanism having connection with said longitudinally movable feed screw.

2. In a wind shield wiper, the combination of a tubular support, a feed member within the tubular support, a wiper unit having connection with the feed member, a second wiping member having connection with the first-named wiping member exclusive of said feed member, said second-named wiping unit having an attaching portion within said tubular support.

3. In a wind shield wiper, the combination of a tubular member, a feed screw within the tubular member and having an active portion terminating adjacent the intermediate portion of the tubular member, a wiper having a nut on the feed screw, a second wiper having an attaching member mounted within the tubular member, a tie rod connecting the attaching member to said nut for movement of the two wipers in unison, and a bearing for said feed screw positioned between said nut and said attaching member.

4. In a structure of the character specified, the combination of a reversible motor, a tubular member, a feed screw within the tubular member and movable endwise therein, there being a tongue and groove slidable driving connection between said reversible motor and said feed screw, a collar rigidly secured to said feed screw, and a reversing switch for said motor provided with a movable arm actuated by said collar.

5. In a windshield wiper, a tubular member, squeegee supports mounted in spaced relation in tandem for longitudinal travel within said tubular member, and a feed screw of less length than that of said tubular member operatively connected to one of said squeegee supports.

6. In a windshield wiper, a tubular member, squeegee supports mounted in spaced relation in tandem for longitudinal travel within said tubular member, a fixed bearing between said squeegee supports, and a feed screw of less length than that of said tubular member operatively connected to one of said squeegee supports and journalled in said bearing.

7. In a windshield wiper, a tubular member, squeegee supports mounted in spaced relation in tandem for longitudinal travel within said tubular member, a fixed bearing between said squeegee supports, a feed screw of less length than that of said tubular member operatively connected to one of said squeegee supports and journalled in said bearing, an end bearing for said feed screw, and a driving shaft having an uninterrupted slidable driving connection with said feed screw within said last mentioned bearing.

8. In a windshield wiper, a main support, squeegee supports movable along the main support in spaced relation, driving means of less length than the main support and operatively connected with one of the squeegee supports only, a motor having connection with said driving means and having a control mechanism provided with an actuating element rigidly mounted on and movable with said driving means, and means connecting the squeegee supports exclusive of the driving means whereby the movement of one squeegee support by the driving means will effect a simultaneous movement of the other squeegee support through said connecting means.

9. In a windshield wiper, a main support, squeegee supports movable along the main support in spaced relation, a bearing carried by the main support between the squeegee supports, driving means of less length than that of the main support and operatively connected to one of said squeegee supports only and supported by said bearing, and a motor having connection with said driving means and having a control mechanism provided with an actuating element rigidly mounted on and movable with said driving means.

10. In a windshield wiper, a main support, a pair of wiper units carried by the main support in spaced relation along the length of the same, driving means associated with the main support and operatively connected with one of said units for actuating the same, a motor having connection with said driving means and having a control mechanism provided with an actuating element rigidly mounted on and movable with said driving means, and means exclusive of the driving means connecting the units in tandem for operation through the drive on one of them only.

11. In a windshield wiper, a tubular housing, a screw mounted for rotation in the housing and extending longitudinally for a portion of the length of the same, a motor having connection with said screw and provided with a control mechanism having an actuating element rigidly mounted on and movable with said screw, two wiper carriers slidably mounted in the housing in spaced relation, one on the screw and the other in the remaining portion of the housing not occupied by the screw, and means connecting the carriers exclusive of the screw whereby the movement of one carrier by the screw will effect the simultaneous movement of the other carrier through said connecting means.

12. In a windshield wiper, a main support, squeegee supports movable along the main support in spaced relation, driving means of less length than the main support and operatively connected with one of the squeegee supports only, and means connecting the squeegee supports exclusive of the driving means whereby the movement of one squeegee support by the driving means will effect a simultaneous movement of the other squeegee support through said connecting means.

13. In a windshield wiper, a main support, squeegee supports movable along the main support in spaced relation, a bearing carried by the main support between the squeegee supports and driving means journaled in said bearing and having operative connection with one only of said squeegee supports and being substantially equal in length to the travel of the squeegee support connected thereto.

14. In a windshield wiper, a tubular member, squeegee supports mounted in spaced relation in tandem for longitudinal travel within said tubular member, and a feed screw of approximately half the length of said tubular member operatively connected to one of said squeegee supports.

In testimony whereof I affix my signature.

JOSEPH BORNSTEIN.